T. HANSON.
APPARATUS FOR ELEVATING LIQUIDS.
No. 191,049. Patented May 22, 1877.
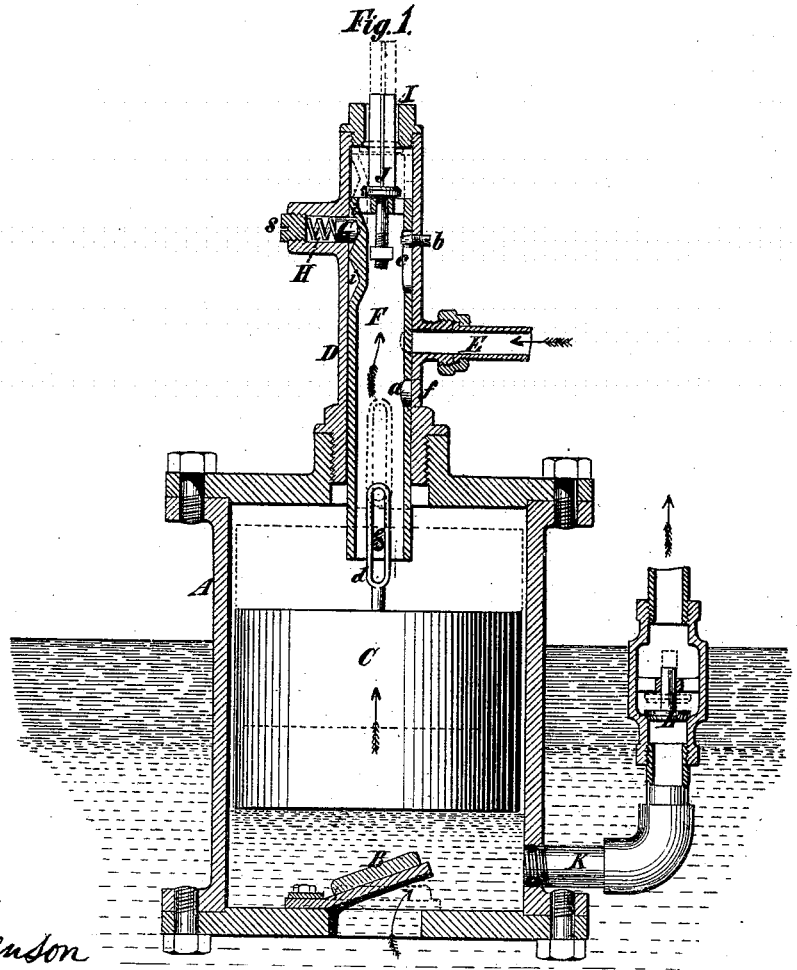

2 Sheets—Sheet 2.
T. HANSON.
APPARATUS FOR ELEVATING LIQUIDS.
No. 191,049. Patented May 22, 1877.
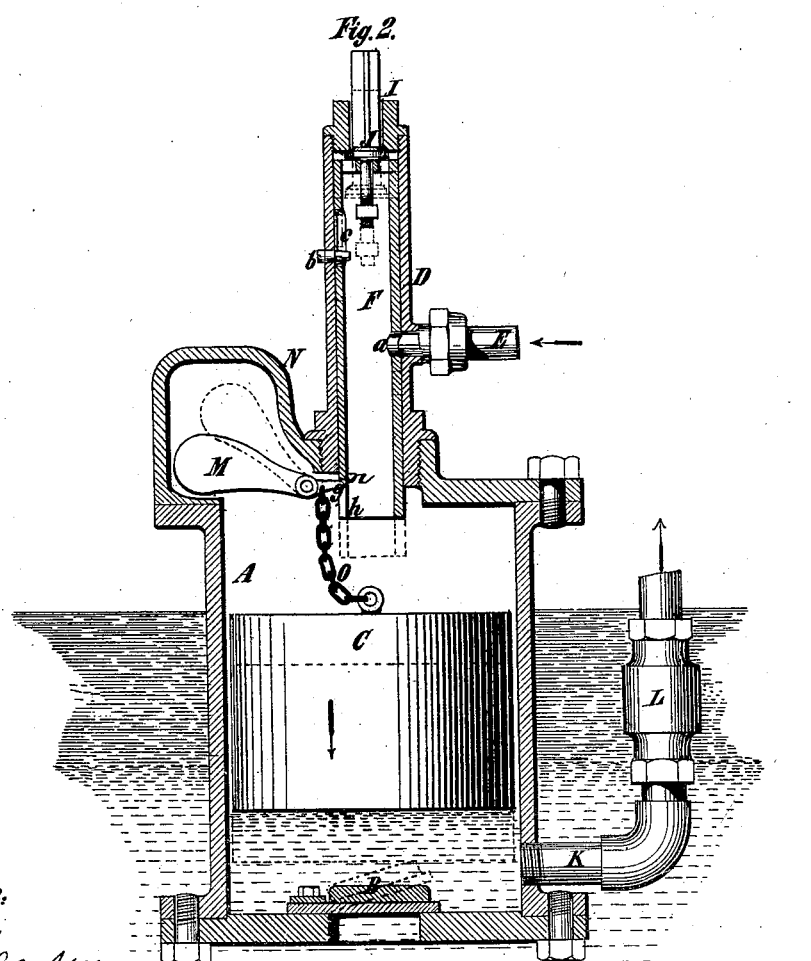
Witnesses:
F. B. Hanson
O. L. VanderVeer
Thomas Hanson

UNITED STATES PATENT OFFICE.

THOMAS HANSON, OF NEW YORK, N. Y.

IMPROVEMENT IN APPARATUS FOR ELEVATING LIQUIDS.

Specification forming part of Letters Patent No. 191,049, dated May 22, 1877; application filed October 9, 1876.

*To all whom it may concern:*

Be it known that I, THOMAS HANSON, of the city, county, and State of New York, have invented a new and Improved Apparatus for Elevating Liquids, of which the following is a description:

This invention, though applicable to other purposes, is especially intended for use in forcing to the upper stories of buildings water which would not flow there from its own pressure.

The invention consists in the combination of a main cylinder or vessel to be immersed in the liquid to be elevated, and provided with an induction-passage, and a valve which may be opened by the inflowing of the liquid, a float arranged within such cylinder and forming or acting in unison with a piston, and a valve for controlling the admission into the cylinder of steam, compressed air, or other motive agent, and a suitable outlet or eduction passage, whereby, on the flow of the liquid in which the cylinder is immersed into the same, the float will be raised, the valve shifted so as to admit the motive agent, and the liquid expelled through the outlet, and so on.

The invention also consists in the combination, with the elements before mentioned, of a push-piece for completing the throw of the valve.

It also consists in the combination, with the said elements, of a stop for holding the valve in position, except when actuated by the float and piston.

It also consists in the combination, with the said elements, of a vent, under control of a valve, providing for the escape of the steam or other motive agent during the ascent of the float and piston.

It also consists in sundry other combinations of parts, which will be hereafter explained.

In the accompanying drawing, Figure 1 is a central vertical section of the improved apparatus, and Fig. 2 is a similar view of an apparatus of slightly-modified form.

Similar letters of reference designate corresponding parts in both figures.

Referring first to Fig. 1, A designates a cylinder, which is designed to be immersed in the liquid to be elevated. It is provided with an induction-valve, B, which the liquid may raise, and flow through the opening which it controls into the cylinder. C designates a float, which is shown as being made to fit snugly within the cylinder, so as to constitute a piston. It may, however, be of other form, and be combined with a separate piston, so as to act in unison therewith. D designates a valve-cylinder or tube erected above the cylinder A, provided with a pipe or passage, E, for the admission of steam, compressed air, or other motive agent, and with a valve, F, for controlling the ingress of the latter. This valve F is of cylindrical form, and has a port or hole, $a$, which, when in line with the pipe or passage E (see dotted outline, Fig. 1, and full outline, Fig. 2) permits the free ingress of the motive agent into the main cylinder A. This valve prevents the ingress of the motive agent when its port or hole $a$ is out of line with the pipe or passage E. (See full outline in Fig. 1 and dotted outline in Fig. 2.)

A guide, consisting of a pin, $b$, fitting in a slot, $c$, in this valve, retains it in such lateral position that when raised its port or hole $a$ will coincide with the pipe or passage E.

G H designate a push-piece, consisting of a bolt, G, and spring H, bearing against an adjustable and removable bearing-plug, S, and acting upon inclines $i$ on the exterior of the valve F, to complete its throw, when necessary. These parts, by fitting above or below the inclines, also serve to hold the valve in position when not actuated by the float or piston. They may, according to circumstances, be used in either or both capacities.

I designates a vent in the valve-cylinder or tube D for permitting the escape of the motive agent, when necessary. It is shown as being controlled by a puppet-valve, J, which is actuated by the main valve, and is closed during the ingress of the motive agent, but is open at other times.

K is the eduction-pipe for the liquid within the main cylinder A. It is provided with a foot-valve, L, to prevent the liquid re-entering the cylinder after it has once escaped therefrom.

The float-piston is shown as connected with the valve B, so as to operate the same. It may, however, be made to control its movements without being directly connected with it, as I will presently explain, and when connected with the valve must be able to move a considerable distance without acting on it. It is represented as being provided, for this purpose, with a slotted rod, $d$, fitting a pin, $e$, in the valve.

The operation of the apparatus is as follows: It is immersed in the liquid to be elevated, preferably, not to a greater depth than its main cylinder A. The liquid raising the induction-valve B and entering the main cylinder A, raises the float-piston by flotation. The latter, in rising, expels any air or any of the motive agent which may be above it, through the vent I, but has no effect on the valve F until near the completion of its stroke or movement, at which time it shifts said valve, and, at the completion of its stroke, effects the admission of the motive agent into the cylinder.

In case the pressure of the motive agent should be so great that the smallest quantity admitted would prevent the further upward movement of the float-piston and valve, the push-piece G H will complete the upward movement of the valve F, and close the vent-valve J; therefore I insure the admission of a full head of the motive agent. The push-piece, then serving in its capacity of stop, retains the valve in place. Acting on the float-piston, or on the piston alone, if, as suggested, it should be made separate from the float, it depresses the same, effects the closing of the induction-valve B, and expels the liquid through the eduction-pipe. Near the completion of its stroke or downward movement it shifts the valve F, and the push-piece, if necessary, completes the stroke, and, in any case, holds the valve in position, the supply of the motive agent is stopped, and the vent I opened.

More liquid now flows into the main cylinder, and the operation is repeated. The liquid, when once expelled, is prevented, by the foot-valve, from returning.

By this apparatus liquids may be elevated to almost any height economically.

The apparatus is applicable for various purposes. It may, with advantage, be used, in connection with a windmill, for raising water, for it may be arranged in a valley containing water, while the windmill may be arranged on a hill or exposed place, and may serve to supply it with compressed air.

It may also be used with great advantage, in connection with steam or other motive agent, to force into the upper stories of buildings water which would not flow there by its own pressure.

I am not restricted to the style of valve shown for controlling the ingress of the motive agent. Many other styles may be used. The push-piece, as before intimated, is not necessary in all cases. The vent I and its valve J may be changed or omitted, and the valve F, through its port $a$, may communicate with a vent, $f$, (shown in dotted lines,) when down.

Fig. 2 illustrates a mode of controlling the valve F by the float and piston without connecting the same directly with said valve. In this case the valve F is connected to a weighted lever, M, pivoted within a bonnet, N, on the head of the main cylinder A by means of a toe, $g$, on said lever fitting in a notch, $n$, in said valve.

This lever just about counterbalances the valve; therefore, when the float-piston in rising reaches the valve, it starts it and the lever; then serves as a push-piece and throws up the valve and keeps it elevated. When the float-piston descends, however, it shifts the lever by means of a chain, O, and releases the valve, so that the latter drops by its own weight and remains down.

What I claim as my invention, and desire to secure by Letters Patent, is—

1. The combination of a main cylinder or vessel provided with induction and eduction passages, a float-piston or float and piston, and a valve controlled by said float-piston or float and piston, and regulating the admission of the motive agent, substantially as set forth.

2. The combination, with a main cylinder provided with induction and eduction passages, and a float-piston or float and piston, and valve controlled by the latter to regulate the admission of the motive agent, of a push-piece for completing the throw or stroke of said valve, substantially as set forth.

3. The combination, with a main cylinder provided with induction and eduction passages, and a float piston or float and piston, and valve controlled by the latter to regulate the admission of the motive agent, of a stop for such valve, substantially as set forth.

4. The combination, with a main cylinder provided with induction and eduction passages, and a float-piston or float and piston, and valve controlled by the same for regulating the admission of the motive agent, of a vent and a valve therefor, substantially as set forth.

5. The combination, with a main valve for regulating the admission of the motive agent to the main cylinder, of a guide for retaining its port in proper position, substantially as set forth.

6. The combination, with a push-piece and stop for the main valve regulating the admission of the motive agent, of an adjustable and removable bearing-piece, substantially as set forth.

7. The combination, in an apparatus, substantially as described, for elevating liquids, of the slotted rod on the float-piston, and the pin with which it engages on the main valve regulating the admission of the motive agent.

THOMAS HANSON.

Witnesses:
F. B. HANSON,
P. L. VANDERKEN.